M. ROBBINS & H. DRESSEL.
EDUCATIONAL DEVICE FOR TEACHING ARITHMETIC.
APPLICATION FILED MAR. 8, 1915.

1,211,625.

Patented Jan. 9, 1917.

WITNESSES:
Howard P. King
Janet A. Ayers

INVENTORS:
May Robbins and
Herman Dressel,
Russell M. Everett,
ATTORNEY.

UNITED STATES PATENT OFFICE.

MAY ROBBINS, OF NEWARK, AND HERMAN DRESSEL, OF KEARNEY, NEW JERSEY.

EDUCATIONAL DEVICE FOR TEACHING ARITHMETIC.

1,211,625.  Specification of Letters Patent.  Patented Jan. 9, 1917.

Application filed March 8, 1915. Serial No. 12,718.

*To all whom it may concern:*

Be it known that we, MAY ROBBINS and HERMAN DRESSEL, both citizens of the United States, and residents, respectively, of Newark, in the county of Essex, and Kearney, in the county of Hudson, both in the State of New Jersey, have invented certain Improvements in Educational Devices for Teaching Arithmetic, of which the following is a specification.

This invention relates more particularly to apparatus for training pupils in multiplication, division and fractional parts, and the objects of the invention are to provide a simple and efficient device of this character for presenting the various operations to the pupil for performance so that any one of a series can be indicated by the instructor pointing to a single number; to provide for this purpose a strip upon which is provided a column of numbers to which the instructor may point; to provide a series of cards or hangers any one of which may be utilized to present in conjunction with the numbers on said strip a corresponding series of operations to be performed; to provide a plurality of such strips and a plurality of such series of cards or hangers; to provide a suitable rack for supporting said strips and cards; to secure simplicity of construction and operation, and to obtain other advantages and results as may be brought out in the following description.

Figure 1:
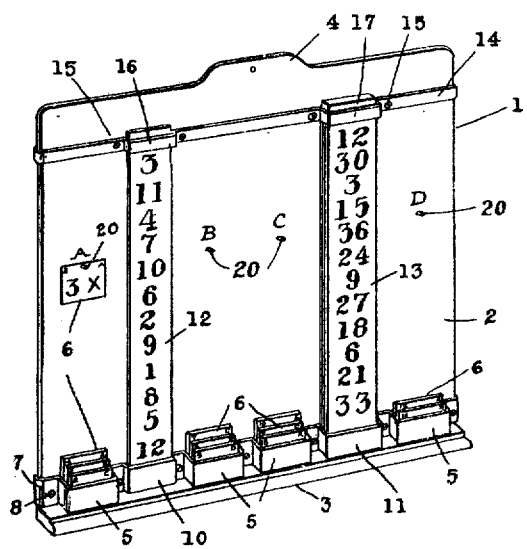
Figure 4:
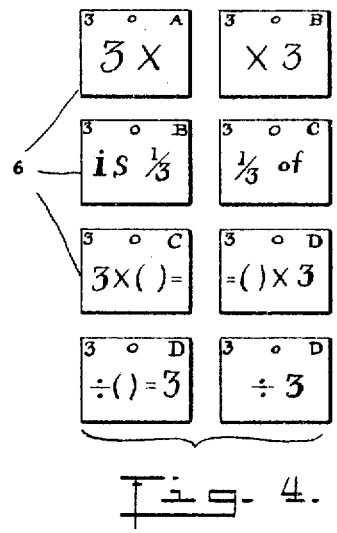
Figure 3:
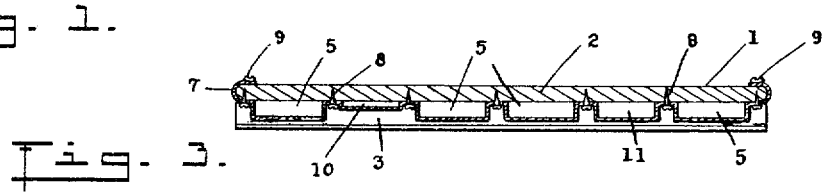
Figure 2:
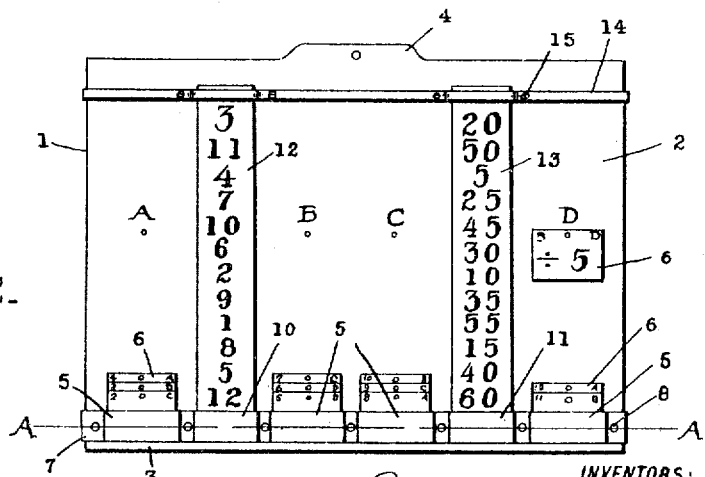

Referring to the accompanying drawings, in which like numerals of reference indicate the same parts throughout the several views, Figure 1 is a perspective view of an apparatus embodying our invention and displaying a series of operations to be performed by a pupil; Fig. 2 is a front view of the same displaying a different series of operations; Fig. 3 is a transverse section on line A—A of Fig. 2, and Fig. 4 is a detail view showing the faces of the several cards or hangers of one series.

In the specific embodiment of the invention shown in the drawing, reference numeral 1 indicates a rack or support comprising a back or board 2 having at its bottom a forwardly projecting ledge 3, the whole being of any suitable material, and of a size and shape which will best adapt it for use in the particular place for which it is intended. Suitable means are provided for holding the support upright for use, such as a perforated extension 4 at the middle of its top edge to receive a nail or hook.

Extending along the front of the back or board 2 just above the ledge 3 is a series of pockets, of which the two end ones and the two middle ones, marked 5, are shown adapted to receive a plurality of series of cards or hangers 6. Preferably these pockets open upwardly and are of less height than the cards, so as to expose a top marginal portion of the cards and allow them to be easily withdrawn or removed. For convenience in construction, the pockets are formed from a single band 7 of sheet metal bent at intervals into spaced relation to the back or board to form the pockets and held at its portions between said pockets flatwise against the board as by screws 8 or the like. The ledge or lip 3 underlying the pockets forms the bottom thereof, and preferably the band 7 rests edgewise upon said ledge thereby effectually closing the bottoms of the pockets. Furthermore, the band 7 is at its ends carried around the edges of the board 2 and secured behind the same, as by screws 9.

In the present disclosure there are shown six pockets, four of which, as above enumerated, are adapted to retain the cards or hangers 6. The other two pockets 10, 11, which are the ones next to the end pockets, are adapted to carry the lower ends of strips 12, 13 which extend upwardly of the face of the board 2 nearly to or adjacent the top thereof. Suitable means are provided for holding the upper ends of said strips 12, 13 in proper position against the back or board 2, which we have shown as a narrow band 14 of sheet metal secured to the face of the board, as by screws 15, transverse to the strips 12, 13, and bent outward as at 16, 17 to receive the said strips between itself and the board. Preferably the bend 16 and pocket 10 near the left-hand end of the back or board are adapted to hold a single strip 12 upon which is printed a column of numbers to serve as multiplicands, while the bend 17 and pocket 11 near the right-hand end of the back or board are adapted to hold a series of strips 13 upon each of which is printed a column of numbers to serve as dividends. Obviously both sides of each strip 13 may receive such a column of numbers and any one of the columns may be exposed as desired by shifting the strips, all of the strips being held removably loose by the pockets and bends at their opposite ends. Other means for holding the strips and cards could be employed without departing from the spirit and scope of our invention but we prefer the means described.

Upon the face of the board 2 and preferably midway of the top and bottom of the columns of numbers on the strips 12, 13 four suitable supports or pins 20 are arranged one adjacent each lateral edge of the strips and adapted to support one of the cards or hangers 6. The cards or hangers 6, as shown in Fig. 4, have thereon each a portion of an indicated operation which remains constant for all the numbers in any one column upon the strips 12, 13 and forms with each number in said column a complete operation to be performed by the pupil.

In order that the cards may be hung in proper relation with respect to the strips so as to state the operations correctly, suitable designations, as A, B, C, D, are placed one over each of the several pins 20 and corresponding designations are placed upon the cards according to the pin upon which it should be hung. Preferably both faces of each card are utilized and we have shown four cards in each series, there being eleven series, from 2 to 12 inclusive. Different series to be kept in the same pocket 5 are furthermore shown as of different heights, so as to be readily distinguished and removed separately, as clearly shown in the drawings. The designating letter, A, B, C or D, is placed near the upper edge of the card, which is thus exposed in the pockets, and said upper margin is also marked with a numeral indicating whether the series is for the twos, threes, fours or what table.

Referring to the apparatus, as shown in Fig. 1, the multiplication table of threes is to be taught, and for this purpose a card reading "3 X" is hung upon the first of the pins 20 to the left of the strip 12, or pin marked A. Upon this strip 12 are numbers from 1 to 12, which is the usual scope of the multiplication table, and the instructor may point to any one of these numbers, for instance 4 or 10 or 3, and the student reads the operation as "3 times 4" or "3 times 10" or "3 times 3" accordingly and gives the answers. Obviously such multiplications could be stated reversely, as four times three, ten times three and so forth, so that another card 3 B is provided which may be hung upon the pin 20 marked B at the right of the strip 12, said card reading "X 3."

The products of each multiplication table are arranged in the columns upon the strips 13, and as shown in Fig. 1 the column exposed at the front contains the products of three with numbers from one to twelve. At one side of this column, upon the pin C, may be hung a card 6 bearing the inscription "1/3 of," or at the other side, upon the pin D, a card 6 may be hung reading "÷ 3." There are numerous other expressions which may be used before or after the columns of products on the strips 13 or before or after the column of numbers from one to twelve on the strip 12, several such inscriptions being shown in the illustration of the card faces in Fig. 4.

It will be understood that not only the table of threes may be taught, but any table, and in Fig. 2 may be seen a rearrangement of cards 6 and strips 13 for instruction in the table of fives, the strip 12 remaining unchanged. The corresponding series of cards 6 having the numeral five replacing the numeral three as above described, is employed for this table, and still other series would be used when teaching other tables with the appropriate column of numbers upon the strips 13, as will be understood. As stated, the cards 6 of each series have the numeral designating the table to which they belong placed at an upper corner and all of the cards of a series are bunched together and the various series inserted in consecutive order in the pockets 5. Several series may be carried by one pocket, and preferably the upper margin of the series farthest from the front is exposed above the other series, and the next one is exposed above the series in front of it, and so forth, as shown in Fig. 2, said exposed margin bearing as well as the table number the letter which shows on which pin 20 it is to be hung.

Having thus described the invention, what we claim is—

1. In an apparatus of the character described, the combination with a back or board, of a strip having a column of numbers thereon, means for removably displaying said strip on said back or board, a series of cards each bearing an inscription adapted to indicate with the successive numbers of said strip different arithmetical operations to be performed by a pupil, means on said back or board adjacent the lateral edges of said strip for detachably supporting said cards, and means on said back or board for filing said cards when not in use.

2. In an apparatus of the character described, the combination with a back or board, of a single strip having a column of numbers thereon, and a series of strips each having on itself a column of multiples of said numbers, means for removably displaying said strips on said back or board, a series of cards each bearing an inscription adapted to indicate with the successive numbers of said strips different arithmetical operations to be performed by a pupil, means on said back or board adjacent the lateral edges of said strips for detachably supporting said cards, and means on said back or board for filing said cards when not in use.

3. In an apparatus of the character described, the combination with a back or board, of a strip having a column of numbers thereon, a band at the bottom of said back or board adapted to receive the lower end of said strip, means at the top of said back or board for removably receiving the top of said strip, a series of cards each bearing an inscription adapted to indicate with the successive numbers of said strip different arithmetical operations to be performed by a pupil, means on said back or board adjacent the lateral edges of said strip for detachably supporting said cards, and means on said back or board for filing said cards when not in use.

4. In an apparatus of the character described, the combination with a back or board, of a strip having a column of numbers thereon, a band at the bottom of said back or board adapted to receive the lower end of said strip, a ledge below said band upon which the strip may rest, means at the top of said back or board for removably receiving the top of said strip, a series of cards each bearing an inscription adapted to indicate with the successive numbers of said strip different arithmetical operations to be performed by a pupil, means on said back or board adjacent the lateral edges of said strip for detachably supporting said cards, and means on said back or board for filing said cards when not in use.

5. In an apparatus of the character described, the combination with a back or board, of a strip having a column of numbers thereon, a band at the bottom of said back or board adapted to receive the lower end of said strip, a band at the top of said back or board for removably receiving the top of said strip, a series of cards each bearing an inscription adapted to indicate with the successive numbers of said strip different arithmetical operations to be performed by a pupil, means on said back or board adjacent the lateral edges of said strip for detachably supporting said cards, and means on said back or board for filing said cards when not in use.

6. In an apparatus of the character described, the combination with a back or board having at its top a perforated extension whereby the same may be supported, of a strip having a column of numbers thereon, a band at the bottom of said back or board providing a plurality of pockets in one of which may be supported the lower end of said strip, a ledge below said band closing the bottom of said pockets, a band at the top of said back or board for removably receiving the top of said strip, a series of cards each bearing an inscription adapted to indicate with the successive numbers of said strip different arithmetical operations to be performed by a pupil, and pins projecting from said back or board adjacent the lateral edges of said strip for detachably supporting said cards, the cards when not in use being adapted to be supported in said pockets.

MAY ROBBINS.
HERMAN DRESSEL.

Witnesses:
HOWARD P. KING,
JANET A. AYERS.

Copies of this patent may be obtained for five cents each, by addressing the "Commissioner of Patents, Washington, D. C."